(12) United States Patent
Tokimi et al.

(10) Patent No.: US 8,915,378 B2
(45) Date of Patent: Dec. 23, 2014

(54) HOLLOW FIBER TYPE REVERSE OSMOSIS MEMBRANE AND METHOD FOR MANUFACTURING THE SAME

(75) Inventors: Shinobu Tokimi, Ohtsu (JP); Toshiyuki Yagi, Ohtsu (JP); Yuji Ito, Ohtsu (JP)

(73) Assignee: Toyobo Co., Ltd., Osaka-shi (JP)

( * ) Notice: Subject to any disclaimer, the term of this patent is extended or adjusted under 35 U.S.C. 154(b) by 70 days.

(21) Appl. No.: 13/805,227

(22) PCT Filed: Aug. 17, 2011

(86) PCT No.: PCT/JP2011/068612
§ 371 (c)(1),
(2), (4) Date: Dec. 18, 2012

(87) PCT Pub. No.: WO2012/026373
PCT Pub. Date: Mar. 1, 2012

(65) Prior Publication Data
US 2013/0140236 A1    Jun. 6, 2013

(30) Foreign Application Priority Data

Aug. 27, 2010 (JP) .................. 2010-190562

(51) Int. Cl.
| | | |
|---|---|---|
| *B01D 69/08* | (2006.01) | |
| *B01D 63/02* | (2006.01) | |
| *B01D 71/16* | (2006.01) | |
| *C02F 1/44* | (2006.01) | |
| *B01D 69/02* | (2006.01) | |
| *B01D 61/02* | (2006.01) | |
| *C02F 103/08* | (2006.01) | |

(52) U.S. Cl.
CPC ............. *B01D 69/087* (2013.01); *B01D 69/02* (2013.01); *B01D 69/08* (2013.01); *B01D 71/16* (2013.01); *C02F 1/441* (2013.01); *B01D 63/02* (2013.01); *B01D 63/021* (2013.01); *B01D 61/025* (2013.01); *B01D 2325/20* (2013.01); *C02F 2103/08* (2013.01)
USPC ............... 210/500.23; 210/500.3; 210/500.32

(58) Field of Classification Search
CPC ............. B01D 63/021; B01D 2325/20; B01D 61/025; B01D 63/02; B01D 69/02; B01D 69/08; B01D 69/087; B01D 71/16; B01D 2325/04; C02F 1/441; C02F 2103/08
USPC ............... 210/500.23, 500.27, 500.29, 500.3, 210/500.31, 500.32
See application file for complete search history.

(56) References Cited

U.S. PATENT DOCUMENTS

| | | | | |
|---|---|---|---|---|
| 4,781,834 | A | * | 11/1988 | Sekino et al. ............ 210/321.88 |
| 2010/0108599 | A1 | * | 5/2010 | Vizvardi et al. .......... 210/500.23 |
| 2010/0219122 | A1 | * | 9/2010 | Ogawa et al. ............ 210/500.23 |

FOREIGN PATENT DOCUMENTS

| | | | |
|---|---|---|---|
| JP | 55-152501 | A | 11/1980 |
| JP | 59-036715 | A | 2/1984 |
| JP | 09-019630 | A | 1/1997 |
| JP | 10-337448 | A | 12/1998 |
| JP | 2003-290632 | A | 10/2003 |
| JP | 2004-082020 | A | 3/2004 |
| WO | WO 2009051168 A1 * | | 4/2009 ............. B01D 69/08 |

OTHER PUBLICATIONS

International Search Report for PCT/JP2011/068612, mailing date of Nov. 1, 2011.
Notification of Transmittal of Translation of the International Preliminary Report on Patentabililty (Form PCT/IB/338) of International Application No. PCT/JP2011/068612 mailed Mar. 28, 2013 with Forms PCT/IB/373 and PCT/ISA/237.

* cited by examiner

*Primary Examiner* — John Kim
(74) *Attorney, Agent, or Firm* — Westerman, Hattori, Daniels & Adrian, LLP (57) ABSTRACT

A hollow fiber type reverse osmosis membrane including cellulose acetate, characterized in that the filtration rate and the salt rejection rate when an aqueous solution having sodium chloride concentration of 1,500 mg/L is filtered from outer side to inner side of the hollow fiber type reverse osmosis membrane at 25° C. and 1.5 MPa pressure are 180 to 350 L/m$^2$/day and 90.0 to 99.0%, respectively and the outer diameter, the inner diameter and the hollow rate of the hollow fiber type reverse osmosis membrane are 100 to 280 μm, 50 to 200 μm and 24 to 42%, respectively. The hollow fiber type reverse osmosis membrane preferably has a dense layer near the outer surface, and thickness of the dense layer is 0.1 to 7 μm.

3 Claims, 1 Drawing Sheet

Fig. 1

Fig. 2

HOLLOW FIBER TYPE REVERSE OSMOSIS MEMBRANE AND METHOD FOR MANUFACTURING THE SAME

TECHNICAL FIELD OF THE INVENTION

The present invention relates to a hollow fiber type reverse osmosis membrane which can maintain both water permeability and rejection rate in high level while reducing the running cost, and also to a method for manufacturing the same. It is used for the production of drinking water and industrial water by saline water desalination, for the production of ultrapure water and particularly as a substitute for a sand filtration step in the treatment of wastewater such as industrial and domestic wastewater with activated sludge, or for the treatment before discharging, etc.

BACKGROUND ART

Since separation/concentration of liquid mixtures by a reverse osmosis membrane method is an energy-saving method and does not cause the phase changes in the state of substances as compared with a separation technique such as distillation, it has been widely utilized in many fields including a food field such as concentration of fruit juice and separation of beer enzyme; a water purification field such as production of drinking water, industrial water, etc. by desalination of seawater and saline water, production of ultrapure water in electronic industry and production of sterile water in pharmaceutical industry and medical field; and recovery of organic substances from industrial wastewater. Treatment of water by a reverse osmosis membrane has become firmly established as an indispensable process supporting the most leading-edge technology.

For example, desalination of seawater and saline water using a reverse osmosis membrane is a clean process and, as compared with thermal desalination method and electrodialysis method, it is advantageous in view of conservation of energy, low cost and simplicity in operation and has produced big results up to now. Particularly due to the fact that a hollow fiber type reverse osmosis membrane can make the membrane area per module large in spite of its small volume of permeable water per unit membrane area as compared with a spiral type reverse osmosis membrane, it has advantages that the permeable water volume can be made large as a whole and that volume efficiency is very high whereby it has been abundantly adopted.

Generally, the hollow fiber type reverse osmosis membrane as mentioned above is manufactured in such a method that a dope containing cellulose acetate is prepared as a polymer material, extruded from a spinneret into air, coagulated in aqueous solution, washed with water and shrunk by annealing by hot water. For example, Examples in the Patent Document 1 disclose a reverse osmosis membrane prepared in such a manner that a dope containing cellulose triacetate as a polymer material is extruded, coagulated, washed with water and annealed by hot water of 85° C. for 20 minutes under no tension. According to the data of the Examples, it is shown that, when 0.2% aqueous solution of sodium chloride was used as a supplying water and measurement was conducted under the pressure of 30 kg/cm$^2$, the filtration rate and NaCl rejection rate were 230 L/m$^2$/day and 99.85% (Example 1); 245 L/m$^2$/day and 99.87% (Example 3); or 250 L/m$^2$/day and 99.84% (Example 4), respectively. Since the filtration rate depends upon the pressure, although the NaCl rejection rate is not so much affected, the filtration rate lowers to an extent of 120 L/m$^2$/day being about one half if the reverse osmosis membrane of the above Examples is measured at 15 kg/cm$^2$ which is one half of the above pressure. Thus, although the conventional reverse osmosis membrane as in the Patent Document 1 can achieve high desalination efficiency because the membrane shrinkage was made large by the annealing treatment by hot water of high temperature, it has a problem that the water permeability lowers when used under low pressure.

Examples of an art where both water permeability and rejection rate are intended to be kept in high level in a reverse osmosis membrane include Patent Documents 2 and 3. The Patent Document 2 discloses an art concerning a hollow fiber type reverse osmosis membrane module which is utilized for the separation of solid or solute from a liquid mixture. However, according to the properties of the hollow fiber membrane using cellulose triacetate shown in Table 1 of the Patent Document 2, the filtration rate (FR1) measured under operation pressure of 55 kg/cm$^2$ is 22.6 to 91.5 L/m$^2$·day and no high water permeability can be achieved.

Patent Document 3 discloses an art concerning a flat sheet type composite reverse osmosis membrane which is equipped, on a microporous support, with an active layer (thin membrane, skin layer) containing interfacial polymerized polyamide as a main component and which has both high salt rejection rate and high permeability. According to the description of Example 1, the reverse osmosis membrane disclosed in the Patent Document 3 has permeation flow rate of 1.0 m$^3$/m$^2$·day (1000 L/m$^2$·day) when measured under an operation pressure of 7.5 kg/m$^2$. However, in this reverse osmosis membrane, aqueous amine solution is made to contact to a polysulfone supporting membrane and then aqueous acid chloride solution is made to contact thereto whereby an interfacial polymerization polyamide layer is formed. Thus, complicated manufacturing steps are needed. Further, a membrane comprising such materials has a problem in terms of resistance to chlorine and has a disadvantage that the cleaning chemicals which can be used therefor are limited.

On the other hand, from recent users attaching great importance to economy, there has been a strong demand for cost reduction in the production of water by a hollow fiber type reverse osmosis membrane. For example, in reverse osmosis methods, cost for power (electric power cost for high-pressure pump) occupies almost one half of the cost for production of water and, when a conventional high pressure reverse osmosis membrane for seawater desalination is used for the treatment of wastewater, it is not possible to suppress the water production cost since the electric power cost is high. Even when a low pressure pump is used and, further, the conventional low pressure reverse osmosis membrane is used for reducing the power cost, no high water permeability is achieved under the current state and, in conclusion, it is not possible to suppress the cost for water production.

As such, it is the current status that there is no hollow fiber type reverse osmosis membrane based on cellulose acetate which can achieve both water permeability and rejection rate in high level at low running cost.

PRIOR ART DOCUMENTS

Patent Documents

Patent Document 1: Japanese Patent Application Laid-Open (JP-A) No. 36715/84
Patent Document 2: Japanese Patent Application Laid-Open (JP-A) No. 337448/98

Patent Document 3: Japanese Patent Application Laid-Open (JP-A) No. 19630/97

DISCLOSURE OF THE INVENTION

Problem that the Invention is to Solve

The present invention has been created in view of the current status of the above-mentioned prior art and its object is to provide a hollow fiber type reverse osmosis membrane which achieves water permeability and rejection rate in high level at a low running cost in the separation of solid or solute from a liquid mixture and also to provide a method for manufacturing the same. The hollow fiber type reverse osmosis membrane of the present invention is particularly suitable for the treatment of raw water having low salt concentration (osmotic pressure) (for example, freshwater such as saline water, sewage water, industrial and domestic wastewater).

Means for Solving the Problem

The present inventors have conducted intensive investigations for achieving the object as such and, as a result, they have found that, when a hollow fiber type reverse osmosis membrane having a section structure where a dense layer having a role of salt rejection is made thinner than the previous ones is used and operation is conducted by a low-pressure pump, water permeability and rejection rate can be achieved in high level at low running cost whereupon the present invention has been accomplished.

Thus, the present invention has the following constitutions (1) to (8).

(1) A hollow fiber type reverse osmosis membrane comprising cellulose acetate, characterized in that the filtration rate and the salt rejection rate when an aqueous solution having sodium chloride concentration of 1,500 mg/L is filtered from outer side to inner side of the hollow fiber type reverse osmosis membrane at 25° C. and 1.5 MPa pressure are 180 to 350 L/m$^2$/day and 90.0 to 99.0%, respectively and the outer diameter, the inner diameter and the hollow rate of the hollow fiber type reverse osmosis membrane are 100 to 280 μm, 50 to 200 μm and 24 to 42%, respectively.

(2) The hollow fiber type reverse osmosis membrane according to (1), wherein a dense layer in 0.1 to 7 μm thickness exists near the outer surface of the hollow fiber type reverse osmosis membrane.

(3) The hollow fiber type reverse osmosis membrane according to (1) or (2), wherein the pressure resistance (−m value) is 0.02 to 0.08.

(4) The hollow fiber type reverse osmosis membrane according to any of (1) to (3), wherein the length of the hollow fiber type reverse osmosis membrane is 15 to 500 cm.

(5) A method for manufacturing the hollow fiber type reverse osmosis membrane mentioned in any of (1) to (4), comprising the steps of: preparing a dope containing cellulose acetate, solvent and nonsolvent; extruding the dope from a spinneret to a coagulating liquid via an air gap to manufacture a hollow fiber membrane; washing this hollow fiber membrane with water; and then subjecting this hollow fiber membrane to an annealing treatment by hot water to shrink the membrane, characterized in that the concentration of cellulose acetate in the dope is 40 to 45% by weight, that the ratio by weight of solvent/nonsolvent in the dope is from 80/20 to 95/5 and that the temperature for the annealing treatment by hot water is 50 to 70° C.

(6) A hollow fiber membrane module, characterized in that, the hollow fiber type reverse osmosis membrane mentioned in any of (1) to (4) is incorporated therein.

(7) A method for producing water, characterized by filtering a liquid mixture through the hollow fiber membrane module mentioned in (6) at the pressure of 0.5 to 2.0 MPa so as to subject the liquid mixture to solid or solute separation.

(8) The method according to (7), wherein the liquid mixture is saline water, sewage water, industrial or domestic wastewater and the osmotic pressure of the liquid mixture is 0.001 to 1.5 MPa.

Advantages of the Invention

The hollow fiber type reverse osmosis membrane according to the present invention is designed in such a manner that high filtration rate is achieved during low pressure filtration while a high salt rejection rate is still maintained. Accordingly, it is possible to separate solid or solute from a liquid mixture or particularly to produce water from freshwater such as saline water, sewage water, wastewater, etc. while achieving both water permeability and rejection rate at low running cost.

BEST MODE FOR CARRYING OUT THE INVENTION

Up to now, development of hollow fiber type reverse osmosis membrane comprising cellulose acetate has been conducted in such a direction that the main purpose is to make the membrane structure dense and that, basically, cellulose acetate concentration in the dope is made high and the membrane after its preparation is subjected to an annealing treatment by hot water of high temperature so that the membrane structure is made further dense. The means as such is reasonable in view of impartment of pressure resistance and of fractionation characteristics and is correct as a direction for the development of reverse osmosis membrane conducting the treatment with medium to high pressure for seawater desalination, etc. However, when it is applied to a reverse osmosis membrane for the treatment of a solution having low salt concentration, the outcome is that a product showing only low filtration rate is prepared due to a low-pressure treatment.

In order to achieve both salt rejection rate and water permeability, the present inventors have conducted an improvement in the membrane structure by taking a new conception for membrane design which sloughs off the conventional way for the development of reverse osmosis membrane. Thus, the present inventors reached the idea that a balance between salt rejection rate and water permeability can be enhanced when asymmetry of the structure is enhanced as compared with a reverse osmosis membrane for the treatment at medium to high pressure and the fractionating layer is made thin and dense. Further, with regard to the design of a membrane module which achieves the maximum performance while sufficient pressure resistance is still maintained, the present inventors paid their attention to optimization of outer diameter and hollow rate of the hollow fiber membrane based on the relation between the fluid pressure loss of a fluid running the hollow part and the membrane area per volume of module. The present invention has been achieved after repetition of trials and errors for actualization of the technical idea as such.

The reverse osmosis membrane of the present invention adopts a hollow fiber type membrane comprising cellulose acetate. Cellulose acetate is resistant to chlorine which is a bactericide and is characterized in that it can easily suppress the growth of microbes. Accordingly, it has an advantage that the pollution with bacteria on the membrane can be effectively suppressed. As to the cellulose acetate, cellulose triacetate is preferred in view of durability. In the hollow fiber type membrane, membrane area per each module can be made more as compared with the spiral type membrane and, in the case of a module nearly in the same size, a membrane area of about ten-fold of that of the spiral type can be achieved. Accordingly, in the hollow fiber type membrane, a treating amount per unit membrane area is very small for obtaining the same filtration rate whereby stain on the membrane can be reduced and running time until washing of the membrane can be made long.

The reverse osmosis membrane of the present invention is a membrane corresponding to a case where the operation pressure is as low as 0.5 to 2 MPa. When a reverse osmosis membrane is classified according to operation pressure, it is generally classified as that for high pressure used at the operation pressure of 5 to 8 MPa, that for medium pressure used at the operation pressure of 2.5 to 4 MPa and that for low pressure use at the operation pressure of 2 MPa or lower. Membrane for high pressure is used for desalination of seawater and has very dense structure for being durable against the pressure higher than the osmotic pressure of seawater. Membrane for medium pressure is intended to be used for the desalination of saline water (salt concentration: 0.1 to 3% by weight) or for the production of ultrapure water. Membrane for low pressure is used for treating water containing almost no salt and is intended to be used for the preparation of ultrapure water, industrial water and drinking water. Since the conventional membrane for high pressure and for medium pressure has a dense structure so as to impart the pressure resistance, the filtration rate lowers in proportion to the pressure when an operation pressure is made low. If the membrane structure is made coarse for enhancing the filtration rate, its fractionating property (salt rejection rate) lowers. Further, the conventional membrane for low pressure has no structure which can achieve high water permeability. The reverse osmosis membrane of the present invention can achieve both water permeability and salt rejection rate in high level by means of low operation pressure and is a product of the design idea which has not been available up to now.

The reverse osmosis membrane of the present invention is characterized in that the filtration rate and the salt rejection rate when an aqueous solution having sodium chloride concentration of 1,500 mg/L is filtered from outer side to inner side of the hollow fiber type reverse osmosis membrane at 25° C. and 1.5 MPa pressure are 180 to 350 L/m$^2$/day and 90.0 to 99.0%, respectively. The reason why the value when the filtration is conducted at the pressure of 1.5 MPa is stipulated as such is that the reverse osmosis membrane of the present invention is intended for the use at the low operation pressure. For achieving the reduction of cost in the water production and for achieving an increase in the treating amount, the filtration rate is preferred to be large and, in view of a cost merit to the conventional hollow fiber type and spiral type, it is 190 L/m$^2$/day or more, or preferably 200 L/m$^2$/day or more. Although there is no problem even if the filtration rate is too much, its upper limit is 330 L/m$^2$/day when the balance with the salt rejection rate to be achieved is taken into consideration. The salt rejection rate should be considered in view of the balance with the filtration rate to be achieved and is 90.0 to 99.0%, or preferably 90.0 to 98.0%.

Although the reverse osmosis membrane of the present invention is expected to be used at low pressure, there is a problem that the membrane property lowers with a lapse of time due to clogging or to sedimentation of suspended substance, etc. onto the membrane when filtration is continued even at the pressure of as low as 2 MPa. In the reverse osmosis membrane of the present invention, its pressure resistance (−m value) is preferred to be within a range of 0.02 to 0.08. When the −m value is within such a range, both property stability and low cost can be achieved such as that interval until washing can be made sufficiently long or that changes in water production amount with a lapse of time are small under the usual using conditions whereby the range as such is preferred. Incidentally, the fact that the −m value is large means that the lowering of the property with a lapse of time is large.

Figure 2:
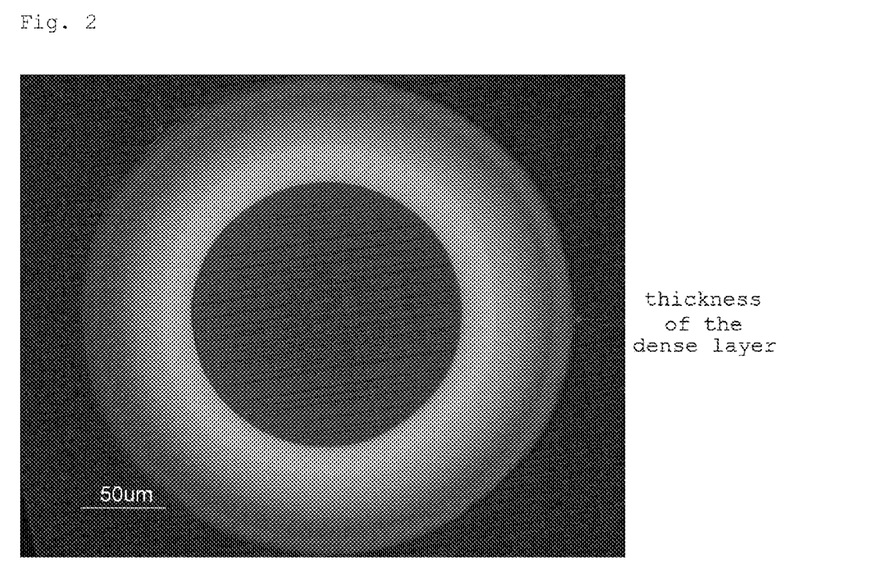
FIG. 2 is a differential interference microscopic image of section structure of an example of the reverse osmosis membrane of the present invention.

As will be noted from the differential interference microscopic image for the section structure in FIG. 2, the reverse osmosis membrane of the present invention preferably has a dense layer near the outer surface and thickness of said dense layer is preferred to be 0.1 to 7 μm. With regard to the thickness of the dense layer which is a substantially active layer for the separation, it is preferred to be thin since the resistance to water permeation becomes low by that and, more preferably, it is 6 μm or less, or most preferably, it is 5 μm or less. However, when the thickness of the dense layer is too thin, latent deficiency in the membrane structure is apt to be revealed and there may occur problems such as that leakage of univalent ion cannot be suppressed or that securing the pressure resistance becomes difficult. Accordingly, thickness of the dense layer is more preferred to be 0.5 μm or more, or is most preferred to be 1 μm or more.

Inner diameter of the reverse osmosis membrane of the present invention is 50 to 200 μm, preferably 75 to 190 μm, or more preferably 75 to 160 μm. When the inner diameter is smaller than the above range, loss in the pressure of the fluid flowing through the hollow part usually becomes large whereby there is a possibility that no desired volume of permeable water is achieved when length of the hollow fiber membrane is made relatively long. On the other hand, when the inner diameter is larger than the above range, scramble between the hollow rate and the module membrane area happens whereby it is necessary to sacrifice any of the pressure resisting property and the membrane area per unit volume.

Outer diameter of the reverse osmosis membrane of the present invention is 100 to 280 μm, preferably 115 to 270 μm, or more preferably 120 to 250 μm. When the outer diameter is smaller than the above range, the inner diameter inevitably becomes small whereby the same problem as in the case of the above inner diameter is resulted. On the other hand, when the outer diameter is larger than the above range, it is not possible to make the membrane area per unit volume in the module large and the compactness which is one of the advantages of the hollow fiber membrane module is deteriorated.

Hollow rate of the reverse osmosis membrane of the present invention is 24 to 42%, or preferably 25 to 40%. When the hollow rate is smaller than the above range, membrane resistance becomes large and there is a possibility that no desired volume of permeable water is achieved. When the hollow rate is larger than the above range, there is a possibility that no sufficient pressure resistance is secured even in case of the use under the treatment at low pressure.

The hollow rate (%) can be determined by the following formula:

$$\text{hollow rate (\%)} = [(\text{inner diameter})/(\text{outer diameter})]^2 \times 100$$

Length of the reverse osmosis membrane of the present invention is preferably 15 to 500 cm, or more preferably 20 to 300 cm. This length is the possible range which is generally used in a hollow fiber membrane module. However, if the length is out of the above range, there is a possibility that it is difficult to achieve both water permeability and salt rejection rate at a low running cost.

Figure 1:
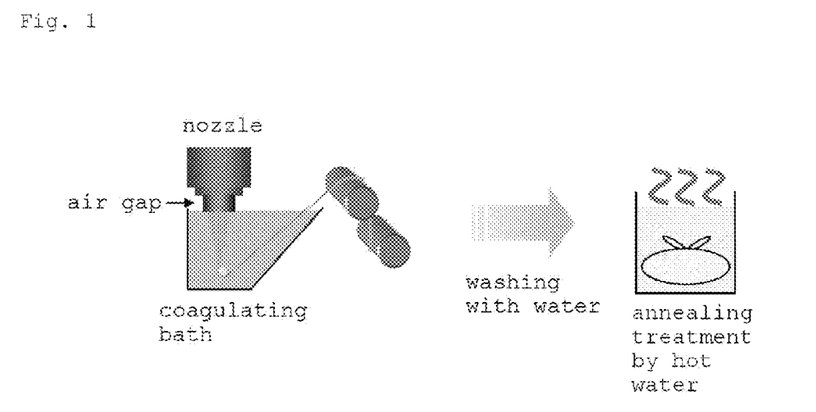
FIG. 1 is an explanatory drawing of the steps for the manufacture of the reverse osmosis membrane of the present invention.

Now an example of a method for the manufacture of a reverse osmosis membrane of the present invention will be illustrated. As shown FIG. 1, the reverse osmosis membrane of the present invention is manufactured by extruding a dope from a spinneret to a coagulating bath via an air gap to manufacture a hollow fiber membrane; by washing the resulting hollow fiber membrane with water; and by subjecting the hollow fiber membrane to an annealing treatment by hot water to shrink the membrane. In such a method, the method for the manufacture of the reverse osmosis membrane of the present invention is characterized in that polymer concentration in the dope is set relatively high and, at the same time, the ratio of solvent/nonsolvent is set high for promoting the asymmetrization of the membrane. When a dope having such a characteristic is extruded from a nozzle of high temperature, much more solvent is evaporated in the air gap whereby coagulation (nucleation) of the polymer takes place. In the next coagulating bath, since the solvent concentration is set low, coagulation finishes quicker than the progress of the phase separation whereby the outer surface structure of the hollow fiber membrane is more thinly densified. On the other hand, since the inner surface side (hollow part side) is a closed system and evaporation of solvent is limited, nucleation and growth of the polymer (progress of phase separation) proceed from the air gap to the coagulating bath whereby asymmetrization is promoted. The hollow fiber membrane prepared as such is subjected to an annealing treatment by hot water under a relatively low temperature condition whereupon moderate membrane shrinkage is resulted so that the outer surface layer is densified and, at the same time, fixation of the membrane structure is conducted.

As to the dope, that which contains cellulose acetate (membrane material), solvent and nonsovent is used and, if necessary, that to which organic acid and/or organic amine are/is added is used. As to the cellulose acetate, it is preferred to use cellulose triacetate. As to the solvent, it is preferred to use one or more member (s) selected from the group consisting of N,N-dimethylformamide, N,N-dimethylacetamide, N-methyl-2-pyrrolidone and N,N-dimethyl sulfoxide. More preferred one is N-methyl-2-pyrrolidone. As to the nonsolvent, it is preferred to use one or more member (s) selected from the group consisting of ethylene glycol, diethylene glycol, triethylene glycol and polyethylene glycol. More preferred one is ethylene glycol. As to the organic acid, it is preferred to use amino acid, aromatic carboxylic acid, hydroxy acid, alkoxy acid, dibasic acid or hydroxy monoester thereof. More preferred ones are phthalic acid, tartaric acid, ε-amino-n-caproic acid, benzoic acid, 4-methylaminobutyric acid, p-oxybenzoic acid and maleic acid and one or more thereof may be used. As to the organic amine, any of primary, secondary and tertiary hydroxyalkylamines may be used. To be more specific, monoethanolamine, triethanolamine, diisopropanolamine and triisopropanolamine are preferred. Triisopropanolamine is more preferred.

Concentration of cellulose acetate in the dope is preferred to be 40 to 45% by weight. When the cellulose acetate concentration is lower than the above range, there may be the case where the hollow fiber membrane structure becomes too coarse and no sufficient separation property and membrane strength are achieved while, when it is higher than the above range, there is a possibility that viscosity of the dope becomes high whereby stability in preparing the membrane is not achieved or water permeability of the resulting membrane cannot be enhanced. In addition, the ratio by weight of solvent/nonsolvent in the dope is preferred to be from 80/20 to 95/5. When the ratio by weight of solvent/nonsolvent is lower than the above range, the membrane surface structure does not become dense since evaporation of the solvent does not proceed and, although water permeability does not greatly change, salt rejection rate becomes low while, when it is higher than the above range, formation of extremely asymmetric membrane proceeds whereby there is a possibility that strength of the membrane is not achieved.

Then the dope prepared as above is dissolved by heating at 90 to 190° C. and the resulting dope is extruded from an arc-type nozzle, a C type nozzle or a tube-in-orifice type nozzle heated at 150 to 180° C. When a tube-in-orifice type nozzle is used, it is preferred to use air, nitrogen, carbon dioxide, argon, etc. as a hollow-forming material. The extruded dope is passed through the air gap (gaseous atmosphere) for 0.02 to 0.4 second and then dipped in an aqueous coagulating bath to coagulate.

As to a composition of solvent and nonsolvent of the coagulating bath, it is preferred to use the same composition as that used for the dope. As to the composition ratio of a coagulating bath, the ratio by weight of solvent:nonsolvent: water is preferred to be 0 to 15:0 to 8:100 to 77. When the rate of water is too low, phase separation of the membrane proceeds and pore size may become too large. Although the rate of water may be 100%, amount of the waste liquid from the coagulating bath in the continuous membrane manufacture become more.

From the hollow fiber membrane pulled out from the coagulating bath, the remaining solvent, nonsolvent, etc. are removed by washing with water. Examples of the method for washing with water include a multistage inclination gutter method for washing with water where water for washing is flown down in a long inclined gutter and a hollow fiber membrane is dipped in said washing water to conduct the washing with water; a Nelson roller method for washing with water where two long rollers (Nelson rollers) crossing in certain angles are used and hollow fiber membranes are wound in fold upon fold on the rollers wherein the Nelson roller surfaces are always made wet with water for washing and the washing with water is conducted by means of contacting said water for washing to the hollow fiber membranes; a net shower washing method with water where hollow fiber membrane is shaken down onto a net followed by washing with shower water; and a washing with water by dipping where hollow fiber membrane is directly dipped into a washing water in a deep vessel followed by washing with water. In the present invention, any one of methods for washing with water can be used for washing with water.

It is preferred that the hollow fiber membrane subjected to a washing treatment with water is dipped into water under a nontensed state and is subjected to an annealing treatment by hot water at 50 to 70° C. for 5 to 60 minutes. As a result of subjecting to an annealing treatment by hot water, improvements in fixation and dimensional stability of membrane structure and in thermal stability can be expected. For such a purpose, in the annealing treatment by hot water, the temperature which is higher than a glass transition point and is lower than a melting point is usually adopted. Even in a case of using cellulose acetate, annealing treatment temperature by hot water of as high as 90° C. or higher is generally adopted in a wet state but, in the present invention, a treating temperature of as relatively low as 50 to 70° C. is adopted whereby the excessive densification of the membrane structure is suppressed.

When the temperature for the annealing treatment by hot water is higher than the above range, densification of the membrane structure proceeds too much whereby the balance between the salt rejection rate and the water permeability may be lost while, when it is lower than the above range, asymmetry of the membrane structure is not sufficient whereby no desired salt rejection rate may be achieved. Time for the annealing treatment by hot water is usually 5 to 60 minutes. When the treating time is too short, no sufficient annealing effect may be achieved. In addition, non-uniformity may be resulted in the membrane structure. When the treating time is too long, not only an increase in manufacturing cost but also too much densification of the membrane may happen whereby no desired balance in the properties may be achieved.

The hollow fiber type reverse osmosis membrane of the present invention prepared as above is incorporated in a hollow fiber membrane module by the conventionally known method. As disclosed in the post-grant publications of Japanese Patent Nos. 4412486, 4277147, 3591618 and 3008886, an example of the incorporation of the reverse osmosis membrane is that 45 to 90 hollow fiber type reverse osmosis membranes are assembled to give a hollow fiber membrane aggregate, a plurality of the resulting hollow fiber membrane aggregates are aligned horizontally and the resulting flat hollow fiber membrane bundle is traversed to a core pipe having many pores to wind around thereon. The winding angle at this time is made 5 to 60° and the winding is done in such a manner that a crossing part is formed on the surface of a specific position of the wound-up body. After that, both ends of this wound-up body are adhered and only one side and/or both sides thereof is/are cut to form a hollow fiber opening (s) whereupon a hollow fiber type separation membrane element is prepared. The resulting hollow fiber type separation membrane element is inserted into a pressure container to assemble a hollow fiber membrane module.

The hollow fiber membrane module of the present invention is suitable for conducting the separation of solid or solute from a liquid mixture by filtering the liquid mixture at the pressure of as low as 0.5 to 2.0 MPa. Preferred liquid mixture is saline water, sewage water, industrial or domestic wastewater and preferred osmotic pressure of the liquid mixture is 0.001 to 1.5 MPa. In accordance with the hollow fiber membrane module of the present invention, water such as drinking water, industrial water or ultrapure water can be produced from such a liquid mixture at low cost.

EXAMPLES

As hereunder, the present invention will be more specifically illustrated by way of Examples although the present invention is not limited to those Examples only. Measurements of the characteristic values measured in the Examples were conducted according to the following methods.

(1) Inner Diameter, Outer Diameter, and Hollow Rate

Inner diameter, outer diameter and membrane thickness of the hollow fiber membrane were obtained in such a manner that appropriate numbers of hollow fiber membrane are inserted into the pores of 3 mm diameter opened in the center of a slide glass to such an extent that the hollow fiber membranes do not fall therethrough, the hollow fiber membranes are cut using a razor along the upper and lower sides of the slide glass to prepare samples of the hollow fiber membrane sections and short and long diameters of the resulting sections of hollow fiber membrane are measured using a projector Nikon PROFILE PROJECTOR V-12. For each hollow fiber membrane section, short and long diameters in two directions were measured and an arithmetic mean value of each of them was adopted as inner or outer diameter of one hollow fiber membrane section while the membrane thickness was calculated as [(outer diameter)−(inner diameter)]/2. Similar measurement was conducted for five sections and mean values thereof were adopted as inner diameter, outer diameters and membrane thickness.

Hollow rate was calculated by the formula [(inner diameter)/(outer diameter)]$^2$×100.

(2) Filtration Rate

After the hollow fiber membranes were bundled and inserted into a sleeve made of plastic, thermosetting resin was injected into the sleeve and hardened to seal. Terminal of the hollow fiber membrane hardened by the thermosetting resin was cut to give an opening of the hollow fiber membrane whereupon there was prepared a module for the evaluation having the membrane area based on the outer diameter of about 0.1 m$^2$. This module for the evaluation was connected to a device for testing the membrane properties comprising a tank for supplying water and a pump whereby the properties were evaluated.

A supplying aqueous solution having sodium chloride concentration of 1,500 mg/L was filtered from outside to inside of the hollow fiber type reverse osmosis membrane at 25° C. and 1.5 MPa pressure and the device was operated for 1 hour. After that, water permeated through the membrane was collected from the opening of the hollow fiber membrane and volume of permeable water was measured by an electron balance (LIBROR EB-3200D manufactured by Shimadzu).

Filtration rate (FR) is calculated by the following formula:

FR [L/m$^2$/day]=volume of the permeable water (L)/ membrane area based on the outer diameter [m$^2$]/ collecting time [minutes]×(60 [minutes]×24 [hours])

(3) Salt Rejection Rate

Sodium chloride concentration was measured using a conductometric detector (CM-25R by To a DKK) from the permeated water collected in the above measurement for filtration rate and the supplying aqueous solution having sodium chloride concentration of 1,500 mg/L used for the same measurement of filtration rate.

Salt rejection rate is calculated by the following formula:

salt rejection rate [%]=(1−salt concentration of permeated water [mg/L]/salt concentration of supplying aqueous solution [mg/L])×100

(4) Pressure Resistance (−m Value)

The module for the evaluation was connected to a device for testing the membrane properties in a similar way as said measurement of filtration rate and a supplying aqueous solution having sodium chloride concentration of 1,500 mg/L was filtered from outside to inside of the hollow fiber type reverse osmosis membrane at 25° C. and 1.5 MPa pressure and the device was operated for 1 hour. After 1 hour operation, permeable water was collected from the opening of the hollow fiber membrane and filtration rate was measured. In a similar way, permeable water was collected after 2 hours operation and 5 hours operation, and filtration rate was measured. After that, permeable water was collected after 100 hours and filtration rate was measured.

Changes in the filtration rate with a lapse of time can be calculated from inclination of logarithms of both time and filtration rate and, when x=log(elapse time) and y=log (filtration rate), the inclination (−m value) can be calculated from a following regression line formula:

$$-m = -1\left(\frac{n\sum xy - (\sum x)(\sum y)}{n\sum x^2 - (\sum x)^2}\right)$$

(5) Thickness of the Dense Layer

After the hollow fiber membrane to be evaluated was washed with water, it was dipped for 1 hour in 2-propanol (Nacalai Tesque) of 25° C. and then dipped for 1 hour in cyclohexane (Nacalai Tesque) of 25° C. to conduct a solvent substitution. Liquid was removed from the hollow fiber membrane after the solvent substitution followed by drying for 24 hours in a vacuum drier (Yamato Vacuum Drying Oven DP41) with inner temperature of 50° C. and inner pressure of −40 Pa. The resulting dried hollow fiber membrane was embedded in resin and a slice was cut out therefrom using a microtome (REICHERT-NISSEI ULTRACUT) so that the hollow fiber membrane section can be observed. The cut-out slice was observed under a differential interference microscope (Nikon Optiphot stand, reflective differential interference apparatus NR). From the resulting microscopic image, thicknesses of dense layers in ten places were measured and a mean value thereof was adopted as the thickness of the dense layer.

Example 1

Cellulose triacetate (CTA, Daicel, LT35) (41% by weight), 49.9% by weight of N-methyl-2-pyrrolidone (NMP, Mitsubishi Chemical), 8.8% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber membrane was washed by a multistage inclination gutter method and shaken off when the membrane was still in a wet state. The resulting hollow fiber membrane was dipped in water of 60° C. and subjected to an annealing treatment for 40 minutes.

The resulting hollow fiber membrane had inner diameter of 100 μm, outer diameter of 175 μm and hollow rate of 33%.

Modules of 1,000 mm length for the evaluation were prepared using the hollow fiber membrane of this Example. Results of the evaluation are summarized in Table 1.

Example 2

Cellulose triacetate (CTA, Daicel, LT35) (41% by weight), 49.9% by weight of N-methyl-2-pyrrolidone (NMP, Mitsubishi Chemical), 8.8% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber membrane was washed by a multistage inclination gutter method and shaken off when the membrane was still in a wet state. The resulting hollow fiber membrane was dipped in water of 52° C. and subjected to an annealing treatment for 40 minutes.

The resulting hollow fiber membrane had inner diameter of 100 μm, outer diameter of 175 μm and hollow rate of 33%.

Modules of 1,000 mm length for the evaluation were prepared using the hollow fiber membrane of this Example. Results of the evaluation are summarized in Table 1.

Example 3

Cellulose triacetate (CTA, Daicel, LT35) (41% by weight), 49.9% by weight of N-methyl-2-pyrrolidone (NMP, Mitsubishi Chemical), 8.8% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber membrane was washed by a multistage inclination gutter method and shaken off when the membrane was still in a wet state. The resulting hollow fiber membrane was dipped in water of 68° C. and subjected to an annealing treatment for 40 minutes.

The resulting hollow fiber membrane had inner diameter of 100 μm, outer diameter of 175 μm and hollow rate of 33%.

Modules of 1,000 mm length for the evaluation were prepared using the hollow fiber membrane of this Example. Results of the evaluation are summarized in Table 1.

Example 4

Cellulose triacetate (CTA, Daicel, LT35) (44% by weight), 47.3% by weight of N-methyl-2-pyrrolidone (NMP, Mitsubishi Chemical), 8.4% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber membrane was washed by a multistage inclination gutter method and shaken off when the membrane was still in a wet state. The resulting hollow fiber membrane was dipped in water of 60° C. and subjected to an annealing treatment for 40 minutes.

The resulting hollow fiber membrane had inner diameter of 100 μm, outer diameter of 175 μm and hollow rate of 33%.

Modules of 1,000 mm length for the evaluation were prepared using the hollow fiber membrane of this Example. Results of the evaluation are summarized in Table 1.

Example 5

Cellulose triacetate (CTA, Daicel, LT35) (41% by weight), 47.0% by weight of N-methyl-2-pyrrolidone (NMP, Mitsubishi Chemical), 11.7% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber membrane was washed by a multistage inclination gutter method and shaken off when the membrane was still in a wet state. The resulting hollow fiber membrane was dipped in water of 60° C. and subjected to an annealing treatment for 40 minutes.

The resulting hollow fiber membrane had inner diameter of 100 μm, outer diameter of 175 μm and hollow rate of 33%.

Modules of 1,000 mm length for the evaluation were prepared using the hollow fiber membrane of this Example. Results of the evaluation are summarized in Table 1.

Example 6

Cellulose triacetate (CTA, Daicel, LT35) (41% by weight), 52.8% by weight of N-methyl-2-pyrrolidone (NMP, Mitsubishi Chemical), 5.9% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber membrane was washed by a multistage inclination gutter method and shaken off when the membrane was still in a wet state. The resulting hollow fiber membrane was dipped in water of 60° C. and subjected to an annealing treatment for 40 minutes.

The resulting hollow fiber membrane had inner diameter of 100 μm, outer diameter of 175 μm and hollow rate of 33%.

Modules of 1,000 mm length for the evaluation were prepared using the hollow fiber membrane of this Example. Results of the evaluation are summarized in Table 1.

Example 7

A hollow fiber membrane having inner diameter of 76 μm, outer diameter of 120 μm and hollow rate of 40% was prepared according to the same manner as in Example 1.

Modules of 1,000 mm length for the evaluation were prepared using the hollow fiber membrane of this Example. Results of the evaluation are summarized in Table 1.

Example 8

A hollow fiber membrane having inner diameter of 170 μm, outer diameter of 270 μm and hollow rate of 40% was prepared according to the same manner as in Example 1.

Modules of 1,000 mm length for the evaluation were prepared using the hollow fiber membrane of this Example. Results of the evaluation are summarized in Table 1.

Example 9

A hollow fiber membrane having inner diameter of 90 μm, outer diameter of 175 μm and hollow rate of 26% was prepared according to the same manner as in Example 1.

Modules of 1,000 mm length for the evaluation were prepared using the hollow fiber membrane of this Example. Results of the evaluation are summarized in Table 1.

Example 10

A hollow fiber membrane having inner diameter of 100 μm, outer diameter of 175 μm and hollow rate of 33% was prepared according to the same manner as in Example 1.

Modules of 200 mm length for the evaluation were prepared using the hollow fiber membrane of this Example. Results of the evaluation are summarized in Table 1.

Comparative Example 1

Cellulose triacetate (CTA, Daicel, LT35) (41% by weight), 49.9% by weight of N-methyl-2-pyrrolidone (NMP, Mitsubishi Chemical), 8.8% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber membrane was washed by a multistage inclination gutter method and shaken off when the membrane was still in a wet state. The resulting hollow fiber membrane was dipped in water of 80° C. and subjected to an annealing treatment for 40 minutes.

The resulting hollow fiber membrane had inner diameter of 100 μm, outer diameter of 175 μm and hollow rate of 33%.

Modules of 1,000 mm length for the evaluation were prepared using the hollow fiber membrane of this Comparative Example. Results of the evaluation are summarized in Table 2.

Comparative Example 2

Cellulose triacetate (CTA, Daicel, LT35) (41% by weight), 49.9% by weight of N-methyl-2-pyrrolidone (NMP, Mitsubishi Chemical), 8.8% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber membrane was washed by a multistage inclination gutter method and shaken off when the membrane was still in a wet state. The resulting hollow fiber membrane was dipped in water of 40° C. and subjected to an annealing treatment for 40 minutes.

The resulting hollow fiber membrane had inner diameter of 100 μm, outer diameter of 175 μm and hollow rate of 33%.

Modules of 1,000 mm length for the evaluation were prepared using the hollow fiber membrane of this Comparative Example. Results of the evaluation are summarized in Table 2.

Comparative Example 3

Cellulose triacetate (CTA, Daicel, LT35) (38% by weight), 52.4% by weight of N-methyl-2-pyrrolidone (NMP, Mitsubishi Chemical), 9.3% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber membrane was washed by a multistage inclination gutter method and shaken off when the membrane was still in a wet state. The resulting hollow fiber membrane was dipped in water of 60° C. and subjected to an annealing treatment for 40 minutes.

The resulting hollow fiber membrane had inner diameter of 100 μm, outer diameter of 175 μm and hollow rate of 33%.

Modules of 1,000 mm length for the evaluation were prepared using the hollow fiber membrane of this Comparative Example. Results of the evaluation are summarized in Table 2.

Comparative Example 4

Cellulose triacetate (CTA, Daicel, LT35) (41% by weight), 41.1% by weight of N-methyl-2-pyrrolidone (NMP, Mitsubishi Chemical), 17.6% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber membrane was washed by a multistage inclination gutter method and shaken off when the membrane was still in a wet state. The resulting hollow fiber membrane was dipped in water of 60° C. and subjected to an annealing treatment for 40 minutes.

The resulting hollow fiber membrane had inner diameter of 100 μm, outer diameter of 175 μm and hollow rate of 33%.

Modules of 1,000 mm length for the evaluation were prepared using the hollow fiber membrane of this Comparative Example. Results of the evaluation are summarized in Table 2.

Comparative Example 5

Cellulose triacetate (CTA, Daicel, LT35) (41% by weight), 49.9% by weight of N-methyl-2-pyrrolidone (NMP, Mitsubishi Chemical), 8.8% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber membrane was washed by a multistage inclination gutter method and shaken off when the membrane was still in a wet state. The resulting hollow fiber membrane was dipped in water of 60° C. and subjected to an annealing treatment for 40 minutes.

The resulting hollow fiber membrane had inner diameter of 204 μm, outer diameter of 300 μm and hollow rate of 46%.

Modules of 1,000 mm length for the evaluation were prepared using the hollow fiber membrane of this Comparative Example. Results of the evaluation are summarized in Table 2.

Comparative Example 6

Cellulose triacetate (CTA, Daicel, LT35) (41% by weight), 49.9% by weight of N-methyl-2-pyrrolidone (NMP, Mitsubishi Chemical), 8.8% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber membrane was washed by a multistage inclination gutter method and shaken off when the membrane was still in a wet state. The resulting hollow fiber membrane was dipped in water of 60° C. and subjected to an annealing treatment for 40 minutes.

The resulting hollow fiber membrane had inner diameter of 144 μm, outer diameter of 300 μm and hollow rate of 23%.

Modules of 1,000 mm length for the evaluation were prepared using the hollow fiber membrane of this Comparative Example. Results of the evaluation are summarized in Table 2.

Comparative Example 7

Cellulose triacetate (CTA, Daicel, LT35) (47% by weight), 44.8% by weight of N-methyl-2-pyrrolidone (NMP, Mitsubishi Chemical), 7.9% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.03 second, dipped into a coagulating bath of 12° C. comprising NMP/EG/water in 4.25/0.75/95. After that, the hollow fiber membrane was washed by a multistage inclination gutter method and shaken off when the membrane was still in a wet state. The resulting hollow fiber membrane was dipped in water of 60° C. and subjected to an annealing treatment for 40 minutes.

The resulting hollow fiber membrane had inner diameter of 100 μm, outer diameter of 175 μm and hollow rate of 33%.

Modules of 1,000 mm length for the evaluation were prepared using the hollow fiber membrane of this Comparative Example. Results of the evaluation are summarized in Table 2.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| dope | polymer concentration (% by weight) | 41 | 41 | 41 | 41 | 41 | 41 | 41 | 41 | 41 | 41 |
| | solvent (% by weight) | 49.9 | 49.9 | 49.9 | 47.3 | 47 | 52.8 | 49.9 | 49.9 | 49.9 | 49.9 |
| | nonsolvent (% by weight) | 8.8 | 8.8 | 8.8 | 8.4 | 11.7 | 5.9 | 8.8 | 8.8 | 8.8 | 8.8 |
| | organic acid (% by weight) | 0.3 | 0.3 | 0.3 | 0.3 | 0.3 | 0.3 | 0.3 | 0.3 | 0.3 | 0.3 |

TABLE 1-continued

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
|  | sovent/nonsolvent (% by weight) | 85/15 | 85/15 | 85/15 | 85/15 | 80/20 | 90/10 | 85/15 | 85/15 | 85/15 | 85/15 |
| temperature for the annealing treatment by hot water (° C.) |  | 60 | 52 | 68 | 60 | 60 | 60 | 60 | 60 | 60 | 60 |
| dimension | inner diameter (μm) | 100 | 100 | 100 | 100 | 100 | 100 | 76 | 170 | 90 | 100 |
|  | outer diameter (μm) | 175 | 175 | 175 | 175 | 175 | 175 | 120 | 270 | 175 | 175 |
|  | hollow rate (%) | 33 | 33 | 33 | 33 | 33 | 33 | 40 | 40 | 26 | 33 |
|  | length (mm) | 1,000 | 1,000 | 1,000 | 1,000 | 1,000 | 1,000 | 1,000 | 1,000 | 1,000 | 200 |
|  | thickness of the dense layer (μm) | 2 | 2 | 2 | 3 | 4 | 1 | 2 | 2 | 2 | 2 |
| property | filtration rate (L/m$^2$/day) | 270 | 300 | 200 | 240 | 250 | 270 | 200 | 300 | 250 | 300 |
|  | salt rejection rate (%) | 97 | 90 | 98 | 98 | 93 | 97 | 95 | 98 | 96 | 98 |
|  | -m value | 0.030 | 0.040 | 0.025 | 0.020 | 0.025 | 0.035 | 0.080 | 0.080 | 0.020 | 0.030 |

TABLE 2

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| dope | polymer concentration (% by weight) | 41 | 41 | 38 | 41 | 41 | 41 | 47 |
|  | solvent (% by weight) | 49.9 | 49.9 | 52.4 | 41.1 | 49.9 | 49.9 | 44.8 |
|  | nonsolvent (% by weight) | 8.8 | 8.8 | 9.3 | 17.6 | 8.8 | 8.8 | 7.9 |
|  | organic acid (% by weight) | 0.3 | 0.3 | 0.3 | 0.3 | 0.3 | 0.3 | 0.3 |
|  | sovent/nonsolvent (% by weight) | 85/15 | 85/15 | 85/15 | 70/30 | 85/15 | 85/15 | 85/15 |
| temperature for the annealing treatment by hot water (° C.) |  | 80 | 40 | 60 | 60 | 60 | 60 | 60 |
| dimension | inner diameter (μm) | 100 | 100 | 100 | 100 | 204 | 144 | 100 |
|  | outer diameter (μm) | 175 | 175 | 175 | 175 | 300 | 300 | 175 |
|  | hollow rate (%) | 33 | 33 | 33 | 33 | 46 | 23 | 33 |
|  | length (mm) | 1,000 | 1,000 | 1,000 | 1,000 | 1,000 | 1,000 | 1,000 |
|  | thickness of the dense layer (μm) | 3 | 2 | 2 | 8 | 2 | 2 | 2 |
| property | filtration rate (L/m$^2$/day) | 130 | 330 | 240 | 200 | 330 | 280 | 120 |
|  | salt rejection rate (%) | 99 | 80 | 84 | 85 | 98 | 97 | 99 |
|  | -m value | 0.010 | 0.100 | 0.080 | 0.015 | 0.100 | 0.018 | 0.043 |

As will be apparent from Table 1, all of the hollow fiber membranes of Examples 1 to 10 had high salt rejection rate and high filtration rate while appropriate pressure resistance was still available in use at low pressure whereby they could separate liquid mixtures at low running cost. On the contrary, in Comparative Example 1, water permeability in initial stage and water permeability with a lapse of time were greatly reduced in spite of its sufficiently high salt rejection rate probably because of too much progress of densification due to high temperature for its annealing treatment by hot water. In Comparative Example 2, temperature for the annealing treatment by hot water was low and densification and fixation of membrane structure were thus insufficient whereby, although the initial water permeability was high, salt rejection rate was low. In Comparative Example 3, polymer concentration was low whereby densification of the structure was insufficient as a whole membrane and, although the initial water permeability was high, salt rejection rate was low. In Comparative Example 4, the solvent/nonsolvent ratio was big and evaporation of the solvent in air gap was likely to be not promoted so well whereby the membrane surface structure was not so much densified as expected and, although water permeability did not greatly change, the salt rejection rate was low. In Comparative Example 5, although the initial water permeability was high, water permeability lowered with a lapse of time and, probably due to high hollow rate and thin membrane thickness, crush was generated in the hollow fiber with a lapse of time. In Comparative Example 6, although there was particularly no problem in water permeability and salt rejection rate, there was a problem due to big outer diameter of the hollow fiber membrane that compactness of module which is one of the merits of a hollow fiber membrane type was lost. In Comparative Example 7, only a hollow fiber membrane having low water permeability was obtained probably due to high polymer concentration in the dope.

INDUSTRIAL APPLICABILITY

The hollow fiber type reverse osmosis membrane according to the present invention can produce water such as drinking water, industrial water or ultrapure water at low running cost while water permeability and rejection rate are still maintained in high level whereby it is very useful in the field of water production using a reverse osmosis membrane.

The invention claimed is:

1. A hollow fiber type reverse osmosis membrane for low pressure use at an operation pressure of 2.0 MPa or lower comprising cellulose acetate, characterized in that the filtration rate and the salt rejection rate when an aqueous solution having sodium chloride concentration of 1,500 mg/L is filtered from outer side to inner side of the hollow fiber type reverse osmosis membrane at 25° C. and 1.5 MPa pressure are 180 to 350 L/m$^2$/day and 90.0 to 99.0%, respectively and the outer diameter, the inner diameter and the hollow rate of the hollow fiber type reverse osmosis membrane are 100 to 280 µm, 50 to 200 µm and 24 to 42%, respectively;

wherein a dense layer in 0.1 to 7 µm thickness exists near the outer surface of the hollow fiber type reverse osmosis membrane.

2. The hollow fiber type reverse osmosis membrane according to claim 1, wherein a pressure resistance (−m value) is 0.02 to 0.08.

3. The hollow fiber type reverse osmosis membrane according to claim 1, wherein a length of the hollow fiber type reverse osmosis membrane is 15 to 500 cm.

* * * * *